(12) United States Patent
Kusama et al.

(10) Patent No.: US 11,453,367 B2
(45) Date of Patent: Sep. 27, 2022

(54) INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Eiichi Kusama, Anjo (JP); Masatoshi Hayashi, Nisshin (JP); Hisanori Mitsumoto, Hadano (JP); Kuniaki Jinnai, Nagoya (JP); Makoto Akahane, Tokyo (JP); Yuriko Yamaguchi, Tokyo (JP); Daisuke Kato, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 399 days.

(21) Appl. No.: 16/688,557

(22) Filed: Nov. 19, 2019

(65) Prior Publication Data
US 2020/0189527 A1 Jun. 18, 2020

(30) Foreign Application Priority Data
Dec. 14, 2018 (JP) .............................. JP2018-234148

(51) Int. Cl.
  *B60S 1/08* (2006.01)
  *B60Q 1/20* (2006.01)
  *G06V 20/56* (2022.01)
(52) U.S. Cl.
  CPC .............. *B60S 1/0844* (2013.01); *B60Q 1/20* (2013.01); *G06V 20/56* (2022.01); *B60Q 2300/312* (2013.01)

(58) Field of Classification Search
  CPC ... B60S 1/0844; B60Q 1/20; B60Q 2300/312; B60Q 1/1423; G06V 20/56; G06V 20/00; G06F 16/583; G06F 16/9537
  See application file for complete search history.

(56) References Cited

U.S. PATENT DOCUMENTS

| | | | |
|---|---|---|---|
| 6,353,392 B1* | 3/2002 | Schofield | B60S 1/0888 340/602 |
| 9,465,987 B1* | 10/2016 | Bell | H04N 7/183 |
| 9,979,934 B1* | 5/2018 | Breiholz | G01W 1/18 |
| 10,657,383 B1* | 5/2020 | Solh | H04N 7/181 |
| 2015/0168167 A1* | 6/2015 | Hwang | G01C 21/3691 701/522 |

(Continued)

FOREIGN PATENT DOCUMENTS

JP 2018-109820 A 7/2018

*Primary Examiner* — Md K Talukder
(74) *Attorney, Agent, or Firm* — Sughrue Mion, PLLC (57) ABSTRACT

An information processing system includes a vehicle and a server that is able to communicate with the vehicle. The server stores weather information indicating the weather. The vehicle receives the weather information from the server and acquires an image in which a scene outside the vehicle is captured when an operating state of an onboard device is not a prescribed operating state corresponding to the weather indicated by the weather information. The vehicle or the server detects the weather from the image. The server updates the weather information to indicate the weather detected from the image when the weather detected from the image and the weather indicated by the weather information do not match and provides information to a client using the updated weather information.

6 Claims, 5 Drawing Sheets

(56) References Cited

U.S. PATENT DOCUMENTS

| | | | |
|---|---|---|---|
| 2016/0109617 A1* | 4/2016 | Hiroi | G01W 1/00 |
| | | | 348/148 |
| 2018/0141563 A1* | 5/2018 | Becker | G06V 20/56 |
| 2018/0180440 A1* | 6/2018 | Masuda | G01C 21/3453 |
| 2019/0213451 A1* | 7/2019 | Schäfer | G06V 10/10 |
| 2020/0189527 A1* | 6/2020 | Kusama | B60Q 1/1423 |

\* cited by examiner

| WEATHER | ONBOARD DEVICE | PRESCRIBED OPERATING STATE |
|---|---|---|
| RAINY | WIPER | ON |
| FOGGY | FOG LAMP | ON (TURNED ON) |
| FAIR | WIPER | OFF |
| | FOG LAMP | OFF (TURNED OFF) |

INFORMATION PROCESSING SYSTEM, PROGRAM, AND INFORMATION PROCESSING METHOD

INCORPORATION BY REFERENCE

The disclosure of Japanese Patent Application No. 2018-234148 filed on Dec. 14, 2018 including the specification, drawings and abstract is incorporated herein by reference in its entirety.

BACKGROUND

1. Technical Field

The disclosure relates to an information processing system, a program, and an information processing method.

2. Description of Related Art

In the related art, a technique of providing weather information indicating the weather or the like is known. In general, weather information which is provided has a constant geographical resolution (for example, an area unit or a location unit) and a constant temporal resolution (for example, a time period unit or a time unit). Regarding such a technique, in order to improve a geographical or temporal resolution, for example, Japanese Patent Application Publication No. 2018-109820 (JP 2018-109820 A) discloses a technique of generating information on weather with a second resolution which is higher than a first resolution based on position information of a vehicle, information in which weather conditions of an area in which the vehicle is located are reflected and which is acquired by an onboard device, and information on weather acquired with the first resolution by a weather observation device.

SUMMARY

As in the technique described in JP 2018-109820 A, when data collected by a vehicle is used, a processing load of a system including a vehicle and a server as a whole increases. Recently, an advanced driver-assistance system (ADAS), automated driving, and the like have been realized and a processing load is predicted to further increase in the future. Accordingly, there is demand for improvement of a technique of providing weather information and curbing of an increase in a processing load.

The disclosure is for improving a technique of providing weather information and curbing an increase in a processing load.

According to an embodiment of the disclosure, there is provided an information processing system including a vehicle and a server that is able to communicate with the vehicle. The server stores weather information indicating the weather. The vehicle receives the weather information from the server and acquires an image in which a scene outside the vehicle is captured when an operating state of an onboard device is not a prescribed operating state corresponding to the weather indicated by the weather information. The vehicle or the server detects the weather from the image. The server updates the weather information to indicate the weather detected from the image when the weather detected from the image and the weather indicated by the weather information do not match and provides information to a client using the updated weather information.

According to another embodiment of the disclosure, there is provided a program causing a vehicle, which is able to communicate with a server that stores weather information indicating the weather, to perform: receiving the weather information from the server; acquiring an image in which a scene outside the vehicle is captured when an operating state of an onboard device is not a prescribed operating state corresponding to the weather indicated by the weather information; and transmitting the image to the server.

According to another embodiment of the disclosure, there is provided an information processing method which is performed by an information processing system including a vehicle and a server that is able to communicate with the vehicle. The information processing method includes: causing the server to store weather information indicating the weather; causing the vehicle to receive the weather information from the server; causing the vehicle to acquire an image in which a scene outside the vehicle is captured when an operating state of an onboard device is not a prescribed operating state corresponding to the weather indicated by the weather information; causing the vehicle or the server to detect the weather from the image; causing the server to update the weather information to indicate the weather detected from the image when the weather detected from the image and the weather indicated by the weather information do not match; and causing the server to provide information to a client using the updated weather information.

With the information processing system, the program, and the information processing method according to the embodiments of the disclosure, it is possible to improve a technique of providing weather information and to curb an increase in a processing load.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described.

(Configuration of Information Processing System)

Figure 1:
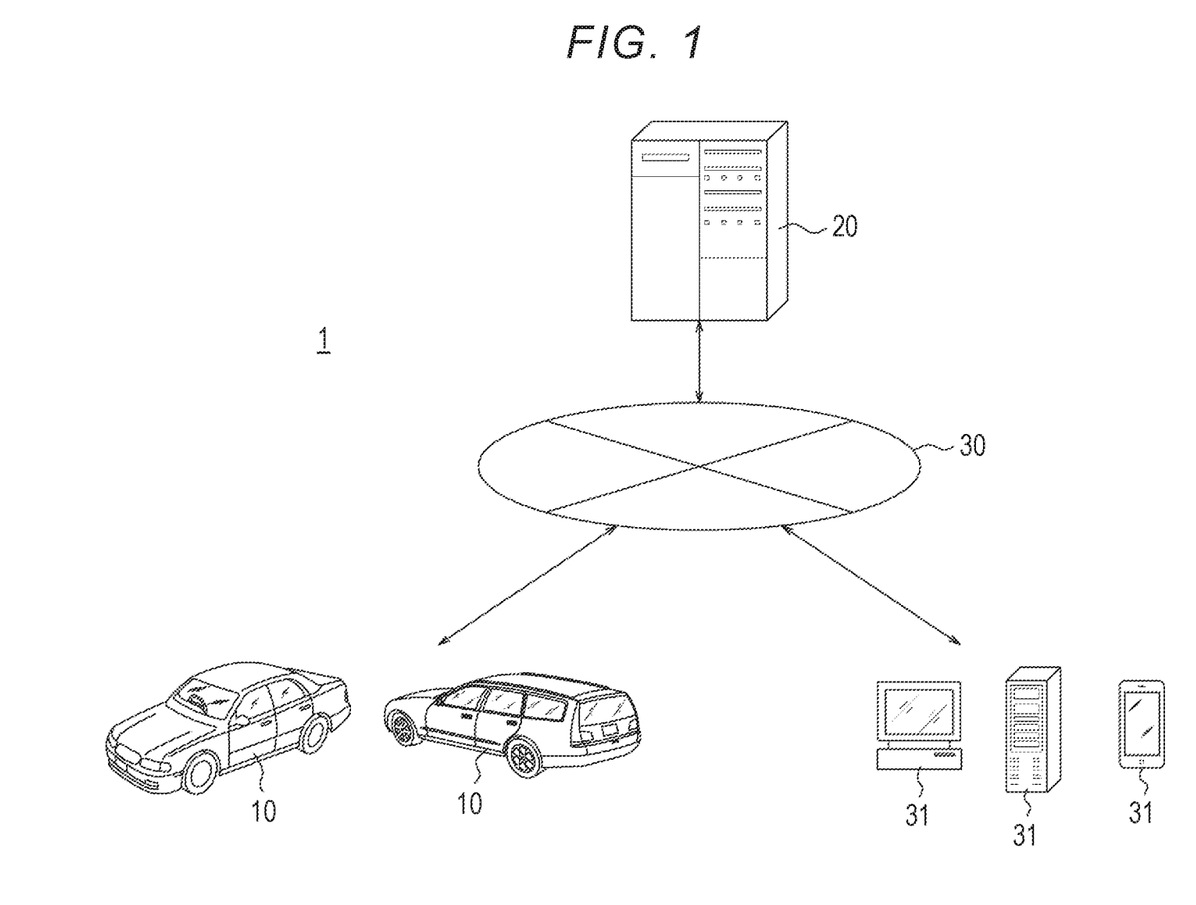
FIG. 1 is a diagram schematically illustrating a configuration of an information processing system according to an embodiment of the disclosure.

An outline of an information processing system 1 according to an embodiment of the disclosure will be described below with reference to FIG. 1. The information processing system 1 includes one or more vehicles 10 and a server 20. Each vehicle 10 is, for example, an automobile, but is not limited thereto and may be an arbitrary vehicle. In FIG. 1, for the purpose of convenience of explanation, two vehicles 10 are illustrated, but the information processing system 1 may include an arbitrary number of vehicles 10. The server 20 includes one information processing device (for example, a server device) or a plurality of information processing devices that can communicate with each other. The vehicle 10 and the server 20 can communicate with each other, for example, via a network 30 including a mobile communication network and the Internet. The server 20 can communicate with a client 31 via the network 30. The client 31 is, for example, a personal computer (PC), a smartphone, or a server device, but may be an arbitrary information processing device.

The outline of this embodiment will be first described below and details thereof will be described later. The server 20 stores weather information indicating weather. Weather indicated by the weather information may not match actual weather due to factors such as limitation of a geographical resolution or a temporal resolution and/or limitation of detection accuracy or prediction accuracy of weather. The vehicle 10 receives the weather information from the server 20. The vehicle 10 determines whether an operating state of an onboard device is a prescribed operating state corresponding to weather indicated by the weather information. As will be described later, for example, an onboard device and a prescribed operating state corresponding to "rainy" are a "wiper" and "ON." Accordingly, when the weather indicated by the weather information is rainy, the vehicle 10 determines whether the operating state of the wiper is ON.

Here, when the operating state of the onboard device is not a prescribed operating state (for example, when the weather information indicates rainy but the operating state of the wiper is not ON), there is a likelihood that the weather indicated by the weather information may not match the actual weather. Accordingly, when it is determined that the operating state of the onboard device is not a prescribed operating state, the vehicle 10 acquires an image in which a scene outside the vehicle is captured, for example, using an onboard camera and transmits the acquired image to the server 20. The server 20 detects weather from the image acquired by the vehicle 10 through image recognition. The server 20 updates weather information stored therein based on a result of comparison between the weather detected from the image and the weather indicated by the weather information stored therein. As will be described later, for example, when the weather detected from the image is "fair" but the weather indicated by the weather information is "rainy" (that is, when actual weather is "fair" but the weather information indicates "rainy"), the weather information is updated to indicate "fair." The server 20 provides information to the client 31 using the stored weather information.

In this way, according to this embodiment, since weather information is updated based on a result of comparison between actual weather detected from an image in which a scene outside the vehicle 10 is captured and weather indicated by the weather information, it is possible to improve accuracy and a geographical or temporal resolution of information which is provided from the server 20 to the client 31. The information processing system 1 can perform processes such as acquisition of an image, detection of weather by image recognition, and comparison between weather detected from an image and weather indicated by weather information only when an operating state of an onboard device is not a prescribed operating state (that is, when there is a likelihood that the weather indicated by the weather information may not match the actual weather). That is, the information processing system 1 does not need to perform the processes when the operating state of the onboard device is the prescribed operating state. Accordingly, it is possible to improve a technique of providing weather information and to curb an increase in a processing load.

The constituent units of the information processing system 1 will be described below in detail.
(Configuration of Vehicle)

Figure 2:
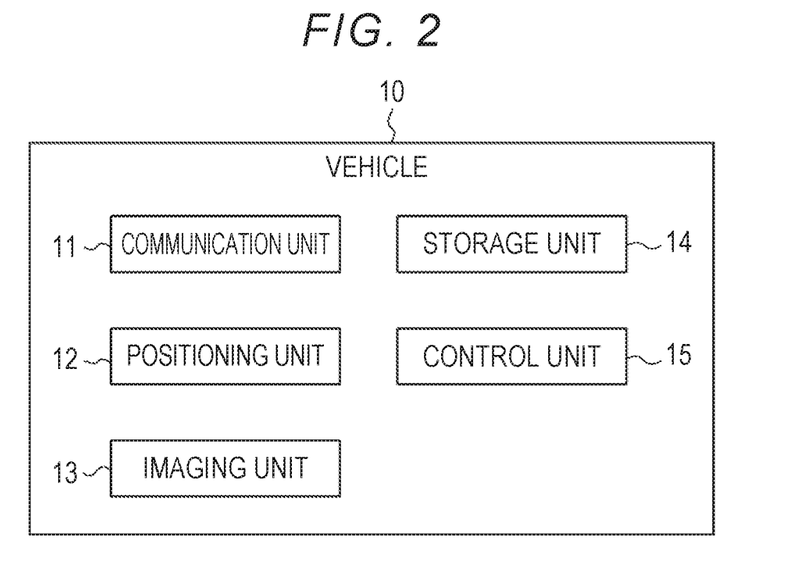
FIG. 2 is a block diagram schematically illustrating a configuration of a vehicle.

As illustrated in FIG. 2, a vehicle 10 includes a communication unit 11, a positioning unit 12, an imaging unit 13, a storage unit 14, and a control unit 15. The communication unit 11, the positioning unit 12, the imaging unit 13, the storage unit 14, and the control unit 15 may be incorporated into the vehicle 10 or may be detachably provided in the vehicle 10. The communication unit 11, the positioning unit 12, the imaging unit 13, the storage unit 14, and the control unit 15 are communicatively connected to each other, for example, via an onboard network such as a controller area network (CAN) or a dedicated line.

The communication unit 11 includes a communication module that is connected to the network 30. The communication module corresponds to a mobile communication standard such as 4th generation (4G) and 5th generation (5G), but is not limited thereto and may correspond to an arbitrary communication standard. For example, an onboard communication device such as a data communication module (DCM) may serve as the communication unit 11. In this embodiment, the vehicle 10 is connected to the network 30 via the communication unit 11.

The positioning unit 12 includes a receiver corresponding to a satellite positioning system. The receiver corresponds to, for example, a global positioning system (GPS), but is not limited thereto and may correspond to an arbitrary satellite positioning system. The positioning unit 12 includes, for example, a gyro sensor and a geomagnetic sensor. For example, a car navigation device may serve as the positioning unit 12. In this embodiment, the vehicle 10 acquires a position of the host vehicle and a direction of the host vehicle using the positioning unit 12.

The imaging unit 13 includes an onboard camera that generates an image by imaging a subject in a view. This image may be a still image or a moving image. The onboard camera may be a monocular camera or a stereoscopic camera. The imaging unit 13 is provided in the vehicle 10 such that a scene outside the vehicle can be captured. For example, an electronic device having a camera function such as a drive recorder or a smartphone which is used by an occupant may serve as the imaging unit 13. In this embodiment, the vehicle 10 acquires an image in which a scene outside the vehicle is captured using the imaging unit 13.

The storage unit 14 includes one or more memories. In this embodiment, each "memory" may be, for example, a semiconductor memory, a magnetic memory, or an optical memory, but is not limited thereto. Each memory included in the storage unit 14 may serve as, for example, a main storage device, an auxiliary storage device, or a cache storage device. The storage unit 14 stores arbitrary information which is used for operation of the vehicle 10. For example, the storage unit 14 may store a system program, an application program, and embedded software. Information stored in the storage unit 14 may be updated, for example, based on information which is acquired from the network 30 via the communication unit 11.

The control unit 15 includes one or more processors. In this embodiment, a "processor" is a general-purpose processor or a dedicated processor specialized in a specific process, but is not limited thereto. For example, an electronic control unit (ECU) which is mounted in the vehicle 10 may serve as the control unit 15. The control unit 15 has a clocking function of acquiring a current time. The control unit 15 controls the whole operation of the vehicle 10.

Figure 3:
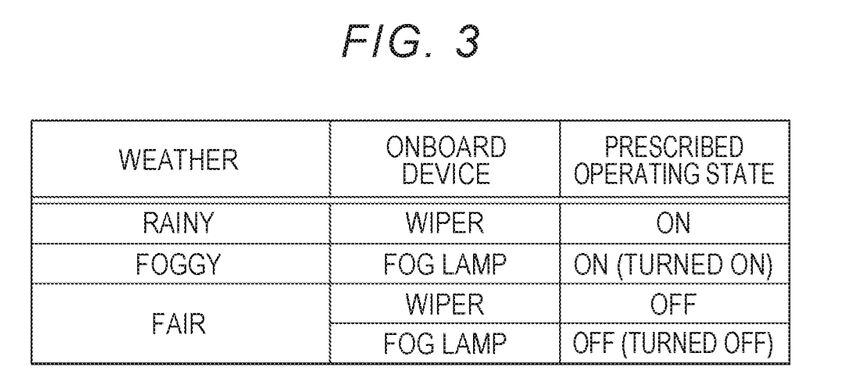
FIG. 3 is a diagram illustrating an example of correspondence information which is stored in the vehicle.

For example, the control unit 15 stores correspondence information indicating a correspondence relationship between weather, an onboard device, and a prescribed operating state in the storage unit 14. For example, as illustrated in FIG. 3, correspondence information according to this embodiment includes three types of weather of "rainy," "foggy," and "fair" and an onboard device and a prescribed operating state corresponding to each type of weather. Specifically, an onboard device and a prescribed operating state corresponding to "rainy" are a "wiper" and "ON." An onboard device and a prescribed operating state corresponding to "foggy" are a "fog lamp" and "ON (a turned-on state)." An onboard device corresponding to "fair" includes a "wiper" and a "fog lamp," a prescribed operating state of the "wiper" is "OFF," and a prescribed operating state of the "fog lamp" is "OFF (a turned-off state)." In this way, the correspondence information is information in which an operating state of an onboard device, the operating state of which is generally considered to vary depending on weather, corresponding to a specific type of weather is defined as a prescribed operating state. The correspondence information is not limited to the example illustrated in FIG. 3. That is, the correspondence information may include weather other than "rainy," "foggy," and "fair." The correspondence information may include an onboard device other than the "wiper" and the "fog lamp." The correspondence information may include a prescribed operating state other than "ON" and "OFF." The correspondence information can be determined, for example, based on experiment, simulation, or experimental rules. The correspondence information may be stored in the storage unit 14 in advance or may be received from the network 30 via the communication unit 11.

The control unit 15 receives weather information indicating weather from the server 20 via the communication unit 11. Specifically, the control unit 15 receives weather information indicating weather corresponding to a current time or a time period to which the current time belongs and weather corresponding to a current position of the vehicle 10 or a geographical area to which the current position belongs.

The control unit 15 identifies an onboard device and a prescribed operating state corresponding to the weather indicated by the weather information based on the above-mentioned correspondence information. The control unit 15 acquires the operating state of the identified onboard device, for example, from the onboard network. The control unit 15 determines whether the operating state of the onboard device is the prescribed operating state corresponding to the weather indicated by the weather information. In this embodiment, when the weather information indicates "rainy," the control unit 15 determines whether the operating state of the "wiper" is "ON" based on the correspondence information illustrated in FIG. 3. When the weather information indicates "foggy," the control unit 15 determines whether the operating state of the "fog lamp" is "ON." When the weather information indicates "fair," the control unit 15 determines whether both the "wiper" and the "fog lamp" are "OFF."

When it is determined that the operating state of the onboard device is not the prescribed operating state, the control unit 15 acquires an image in which a scene outside the vehicle is captured using the imaging unit 13. Here, the control unit 15 may acquire an image by causing the imaging unit 13 to image a scene outside the vehicle when it is determined that the operating state of the onboard device is not the prescribed operating state. Alternatively, the control unit 15 may cause the imaging unit 13 to capture a moving image of a scene outside the vehicle and acquire an image when it is determined that the operating state of the onboard device is not the prescribed operating state by extracting the image from the moving image. The control unit 15 acquires a time (an imaging time) at which the acquired image has been captured and a position (an imaging position) of the vehicle 10 at that time.

The control unit 15 transmits the acquired image, the imaging time, and the imaging position to the server 20 via the communication unit 11.

(Configuration of Server)

Figure 4:
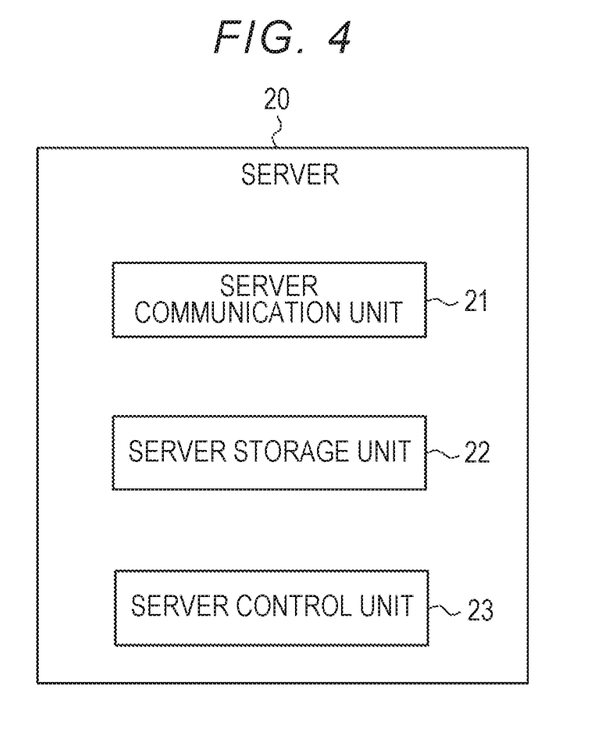
FIG. 4 is a block diagram schematically illustrating a configuration of a server.

As illustrated in FIG. 4, the server 20 includes a server communication unit 21, a server storage unit 22, and a server control unit 23.

The server communication unit 21 includes a communication module that is connected to the network 30. For example, the communication module corresponds to a wired local area network (LAN) standard, but is not limited thereto and may correspond to an arbitrary communication standard. In this embodiment, the server 20 is connected to the network 30 via the server communication unit 21.

The server storage unit 22 includes one or more memories. Each memory included in the server storage unit 22 may serve as, for example, a main storage device, an auxiliary storage device, or a cache storage device. The server storage unit 22 stores arbitrary information which is used for operation of the server 20. For example, the server storage unit 22 may store a system program, an application program, a database, and map information. Information which is stored in the server storage unit 22 may be updated with, for example, information which is acquired from the network 30 via the server communication unit 21.

The server control unit 23 includes one or more processors. The server control unit 23 controls the whole operation of the server 20.

For example, the server control unit 23 stores weather information indicating weather in the server storage unit 22. The weather information may have a predetermined geographical resolution such as an area unit or a location unit. The weather information may have a predetermined temporal resolution such as a time period unit or a time unit. The weather information may be provided from an organization such as a meteorological agency via the network 30 or may be generated based on observation data which is received from a weather observation device via the network 30.

Figure 5:
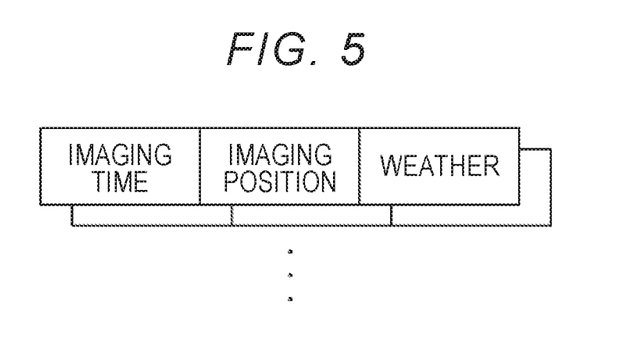
FIG. 5 is a diagram illustrating an example of information which is stored in the server.

The server control unit 23 receives an image in which a scene outside the vehicle is captured, an imaging time, and an imaging position from the vehicle 10 via the server communication unit 21. The server control unit 23 detects weather from the received image by image recognition. An arbitrary image recognition algorithm can be employed to detect weather from an image. For example, a technique of detecting water droplets attached to a front windshield of the vehicle 10 by an image recognition algorithm such as pattern matching, feature point extraction, or machine learning can be employed to detect rainy weather. For example, a technique of determining generation of fog based on image characteristics such as contrast and tone of an image can be employed to detect foggy weather. For example, as illustrated in FIG. 5, the server control unit 23 stores the imaging time, the imaging position, and the weather detected from the image in the server storage unit 22 in correlation with each other. Here, the image in addition to the imaging time, the imaging position, and the detected weather may be additionally stored.

The server control unit 23 updates weather information stored in the server storage unit 22 based on a result of comparison between the weather detected from the image and the weather indicated by the weather information. Specifically, when the weather detected from the image is different from the weather indicated by the weather information, the server control unit 23 updates the weather information stored in the server storage unit 22 to indicate the weather detected from the image.

Here, when the geographical resolution of the weather information stored in the server storage unit 22 is a location unit, the weather of the location corresponding to the imaging position is updated. For example, when the geographical resolution of the weather information stored in the server storage unit 22 is an area unit, weather of the area to which the imaging position belongs may be updated. Alternatively, when the geographical resolution of the weather information stored in the server storage unit 22 is an area unit, weather at the imaging position may be updated (the weather of the location unit corresponding to the imaging position may be added) or weather of a subarea including the imaging position out of the area to which the imaging position belongs may be updated (weather of a subarea unit including the imaging position may be added). In this case, the geographical resolution of the weather information is improved from an area unit to a location unit or a subarea unit by updating the weather information.

When the temporal resolution of the weather information stored in the server storage unit 22 is a time unit, weather at the imaging time is updated. For example, when the temporal resolution of the weather information stored in the server storage unit 22 is a time period unit, weather of the time period to which the imaging time belongs may be updated. Alternatively, when the temporal resolution of the weather information stored in the server storage unit 22 is a time period unit, weather at the imaging time may be updated (weather of the time unit corresponding to the imaging time may be added) or weather of a partial time period including the imaging time out of the time period to which the imaging time belongs may be updated (weather of a short time period unit including the imaging time may be added). In this case, the temporal resolution of the weather information is improved from a time period unit to a time unit or a short time period unit by updating the weather information.

The server control unit 23 provides information to the client 31 using the updated weather information. The provision of information may be performed, for example, in response to a request from the client 31 (for example, pull-transmission) or may be performed automatically by the server control unit 23 (for example, push-transmission). The provision of information may be performed by a web application which is stored in the server storage unit 22. The provision of information which is performed using the updated weather information may include provision of the weather information without any change or may include provision of arbitrary information which is newly generated using the weather information.

(Flow of Operations in Vehicle)

Figure 6:
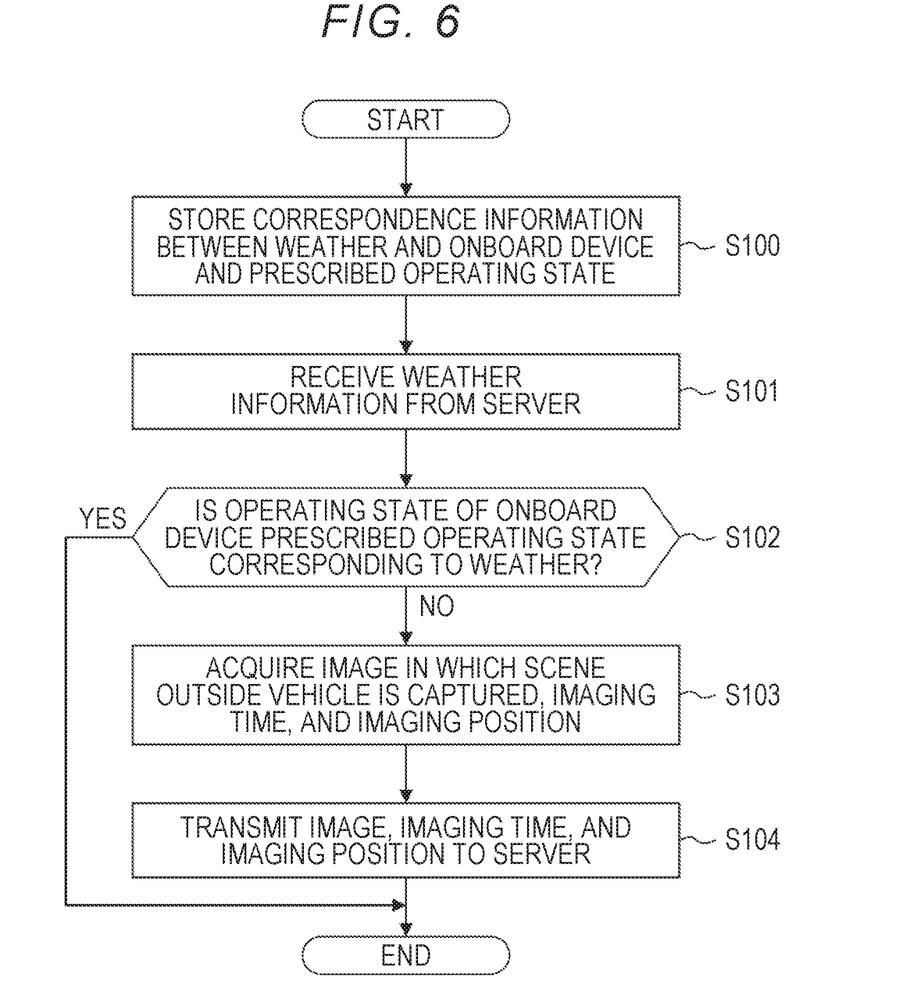
FIG. 6 is a flowchart illustrating an operation of the vehicle.

A flow of operations in the vehicle 10 will be described below with reference to FIG. 6.

Step S100: The control unit 15 stores correspondence information indicating a correspondence relationship between weather, an onboard device, and a prescribed operating state in the storage unit 14.

Step S101: The control unit 15 receives weather information indicating weather from the server via the communication unit 11.

Step S102: The control unit 15 determines whether an operating state of an onboard device is a prescribed operating state corresponding to the weather indicated by the weather information. When it is determined that the operating state is a prescribed operating state (YES in Step S102), the process routine ends. On the other hand, when it is determined that the operating state is not a prescribed operating state (NO in Step S102), the process routine progresses to Step S103.

Step S103: The control unit 15 acquires an image in which a scene outside the vehicle is captured, an imaging time, and an imaging position.

Step S104: The control unit 15 transmits the acquired image, the acquired imaging time, and the acquired imaging position to the server 20 via the communication unit 11.

(Flow of Operations in Server)

Figure 7:
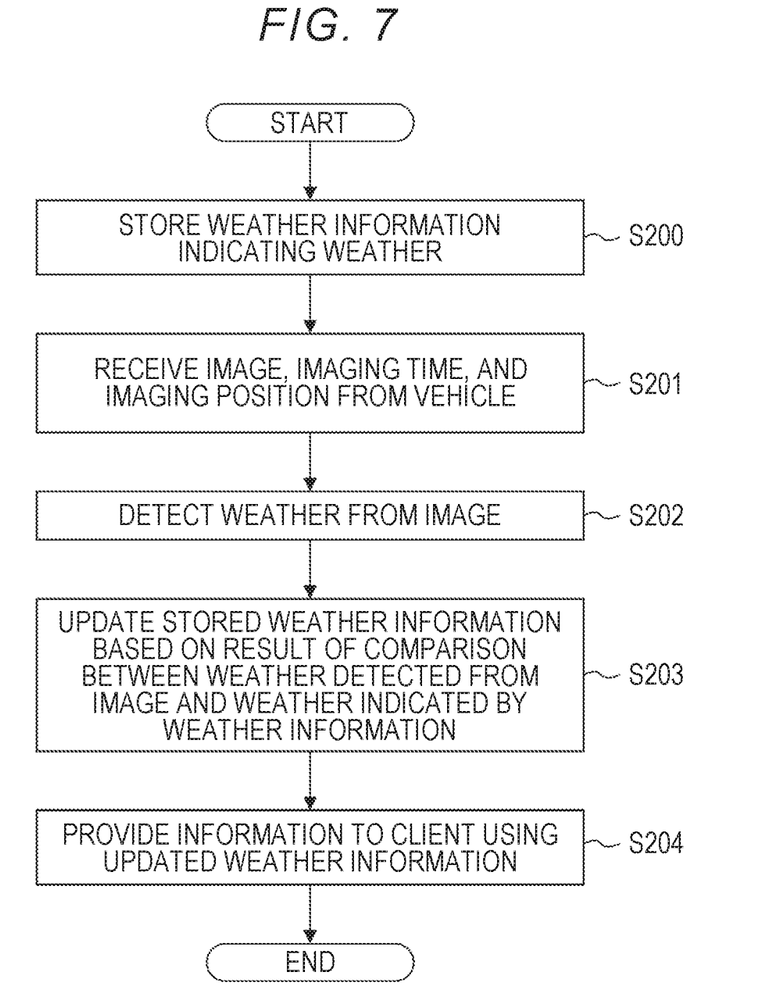
FIG. 7 is a flowchart illustrating an operation of the server.

A flow of operations in the server 20 will be described below with reference to FIG. 7.

Step S200: The server control unit 23 stores weather information indicating weather in the server storage unit 22.

Step S201: The server control unit 23 receives an image in which a scene outside a vehicle is captured, an imaging time, and an imaging position from the vehicle 10 via the server communication unit 21.

Step S202: The server control unit 23 detects weather from the received image by image recognition.

Step S203: The server control unit 23 updates the weather information stored in the server storage unit 22 based on a result of comparison between the weather detected from the image and the weather indicated by the weather information.

Step S204: The server control unit 23 provides information to the client 31 using the updated weather information.

As described above, in the information processing system 1 according to this embodiment, when an operating state of an onboard device of the vehicle 10 is not a prescribed operating state corresponding to weather indicated by weather information, an image in which a scene outside the vehicle is captured is acquired and weather is detected from the image. When the detected weather is different from the weather indicated by the weather information, the stored weather information is updated to indicate the weather detected from the image and information is provided to the client 31 using the updated weather information.

With this configuration, since weather information is updated when actual weather detected from an image in which a scene outside the vehicle 10 is captured is different from the weather indicated by the weather information, it is possible to improve accuracy of information which is provided from the server 20 to the client 31 and a geographical or temporal resolution thereof. The information processing system 1 has only to perform processes such as acquisition of an image, detection of weather by image recognition, and comparison between the weather detected from the image and the weather indicated by the weather information only when an operating state of an onboard device is not a prescribed operating state (that is, when there is a likelihood that the weather indicated by the weather information will not match the actual weather). That is, the information processing system 1 does not need to perform the processes when the operating state of the onboard device is the prescribed operating state. Accordingly, it is possible to improve a technique of providing weather information and to curb an increase in a processing load.

While the disclosure has been described above in conjunction with all the drawings and the embodiments, it should be noted by those skilled in the art that various modifications and corrections can be easily made based on the present disclosure. Accordingly, it should be noted that such modifications and corrections are included in the scope of the disclosure. For example, the functions included in the units or the operations can be rearranged as long as doing so does not result in logical inconsistency, and a plurality of units or operations may be combined into one unit or an operation or may be divided.

For example, in the above-mentioned embodiment, some processing operations which are performed by the vehicle 10 may be performed by the server 20, or some processing operations which are performed by the server 20 may be performed by the vehicle 10. For example, the process of determining whether the operating state of an onboard device is a prescribed operating state corresponding to the weather may be performed by the server 20 instead of the vehicle 10. In this case, the vehicle 10 transmits the operating states of the onboard devices to the server 20 in addition to an image in which a scene outside the vehicle is captured, an imaging time, and an imaging position. The server 20 stores correspondence information of the vehicle 10 in advance. The server 20 specifies weather corresponding to the imaging time and the imaging position from the weather information stored in the server storage unit 22. The server 20 determines whether the operating state of an onboard device is a prescribed operating state corresponding to the weather. For example, processes such as detection of the weather from an image and comparison between the weather detected from the image and the weather indicated by the weather information may be performed by the vehicle 10 instead of the server 20.

For example, a general-purpose information processing device such as a smartphone or a computer may be made to serve as the constituent units of the vehicle 10 or the server 20 according to the above-mentioned embodiment. Specifically, a program in which processing details for realizing the functions of the vehicle 10 or the server 20 according to the embodiment are described is stored in a memory of an information processing device and a processor of the information processing device is made to read and execute the program. Accordingly, the disclosure based on this embodiment can also be embodied as a program which can be executed by a processor.

What is claimed is:

1. An information processing system comprising a vehicle and a server that is able to communicate with the vehicle,
wherein the server stores first weather information for an area indicating weather within the area,
wherein the vehicle, while located in a subarea within the area:
receives the first weather information for the area from the server,
identifies a prescribed operating state of an onboard device of the vehicle, the prescribed operating state corresponding to the weather indicated by the first weather information for the area, and
selectively acquires an image capturing a scene outside the vehicle responsive to the operating state of the onboard device being different from the prescribed operating state,
wherein one of the vehicle and the server detects weather from the image, and
wherein the server:
selectively stores second weather information for the subarea responsive to the weather detected from the image being different from the weather indicated by the first weather information for the area, the second weather information indicating the weather detected from the image, and
provides information to a client including the first weather information for the area and the second weather information for the subarea.

2. The information processing system according to claim 1, wherein the onboard device is a wiper and the prescribed operating state is ON when the weather indicated by the weather information is rainy.

3. The information processing system according to claim 1, wherein the onboard device is a fog lamp and the prescribed operating state is ON when the weather indicated by the weather information is foggy.

4. The information processing system according to claim 1, wherein the onboard device includes one of a wiper and a fog lamp and the prescribed operating state is OFF when the weather indicated by the weather information is fair.

5. A non-transitory information storage medium having a program stored thereon which, when executed by a processor, causes a vehicle, which is able to communicate with a server that stores weather information indicating the weather, to:
receive first weather information for an area from the server, the vehicle being located in a subarea within the area;
identifying a prescribed operating state of an onboard device of the vehicle, the prescribed operating state corresponding to the weather indicated by the first weather information for the area;
selectively acquire an image capturing a scene outside the vehicle responsive to the operating state of the onboard device being different from the prescribed operating state; and
transmit the image to the server in association with the subarea.

6. An information processing method which is performed by an information processing system including a vehicle and a server that is able to communicate with the vehicle, the information processing method comprising:
causing the server to store first weather information for an area indicating weather within the area;
causing the vehicle, while located in a subarea within the area, to receive the first weather information for the area from the server;
causing the vehicle to identify a prescribed operating state of an onboard device of the vehicle, the prescribed operating state corresponding to the weather indicated by the first weather information for the area;
causing the vehicle to selectively acquire an image capturing a scene outside the vehicle responsive to the operating state of the onboard device being different from the prescribed operating state;
causing one of the vehicle and the server to detect weather from the image;
causing the server to selectively store second weather information for the subarea responsive to the weather detected from the image being different from the weather indicated by the first weather information for the area, the second weather information indicating the weather detected from the image; and causing the server to provide information to a client including the first weather information for the area and the second weather information for the subarea.

\* \* \* \* \*